(12) United States Patent
Vogel

(10) Patent No.: US 8,886,531 B2
(45) Date of Patent: Nov. 11, 2014

(54) APPARATUS AND METHOD FOR GENERATING AN AUDIO FINGERPRINT AND USING A TWO-STAGE QUERY

(75) Inventor: Brian Kenneth Vogel, Weidman, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 1024 days.

(21) Appl. No.: 12/686,779

(22) Filed: Jan. 13, 2010

(65) Prior Publication Data

US 2011/0173208 A1 Jul. 14, 2011

(51) Int. Cl.
*G10L 21/00* (2013.01)
*G06F 17/30* (2006.01)
*G10L 25/48* (2013.01)

(52) U.S. Cl.
CPC .......... *G10L 25/48* (2013.01); *G06F 17/30743* (2013.01); *G06F 17/30784* (2013.01)
USPC ............. 704/239; 704/273; 700/94; 707/746

(58) Field of Classification Search
CPC ..................... G06F 17/30743; G06F 17/30784
USPC ....................... 704/273, 270, 275; 726/26–32; 707/770, 736
See application file for complete search history.

(56) References Cited

U.S. PATENT DOCUMENTS

| | | | |
|---|---|---|---|
| 3,663,885 A | 5/1972 | Stewart | 328/140 |
| 4,677,466 A | 6/1987 | Lert et al. | 358/84 |
| 4,843,562 A | 6/1989 | Kenyon et al. | 364/487 |
| 5,210,820 A | 5/1993 | Kenyon | 395/2 |
| 5,432,852 A | 7/1995 | Leighton et al. | 380/30 |
| 5,436,653 A * | 7/1995 | Ellis et al. | 725/22 |
| 5,437,050 A | 7/1995 | Lamb et al. | 455/2 |
| 5,473,759 A | 12/1995 | Slaney et al. | 395/2.75 |
| 5,612,729 A | 3/1997 | Ellis et al. | 348/2 |
| 5,647,058 A | 7/1997 | Agrawal et al. | 395/601 |
| 5,825,830 A | 10/1998 | Kopf | 375/340 |
| 5,862,260 A | 1/1999 | Rhoads | 382/232 |
| 5,918,223 A | 6/1999 | Blum et al. | 707/1 |

(Continued)

FOREIGN PATENT DOCUMENTS

| | | |
|---|---|---|
| WO | 99/30488 | 6/1999 |
| WO | 01/20483 | 3/2001 |

(Continued)

OTHER PUBLICATIONS

Tzanetaski, G., "Multifeature Audio Segmentation for Browing and Annotation", pp. W99-1-W99-4; Proc. 1999 IEEE Workshop on Applications of Signal Processing to Audio and Acoustics, New Paltz, New York, Oct. 17-20, 1999.

(Continued)

*Primary Examiner* — Jialong He
(74) *Attorney, Agent, or Firm* — Inventive Patent Law P.C.; Jim H. Salter

(57) ABSTRACT

An audio fingerprint is generated by transforming an audio sample of a recording to a time-frequency domain and storing each time-frequency pair in a matrix array, detecting a plurality of local maxima for a predetermined number of time slices, selecting a predetermined number of largest-magnitude maxima from the plurality of local maxima detected by said detecting, and generating one or more hash values corresponding to the predetermined number of largest-magnitude maxima.

21 Claims, 8 Drawing Sheets

(56) References Cited

U.S. PATENT DOCUMENTS

| | | | |
|---|---|---|---|
| 5,960,388 A | 9/1999 | Nishiguchi et al. | 704/208 |
| 5,987,525 A | 11/1999 | Roberts et al. | 709/248 |
| 6,061,680 A | 5/2000 | Scherf et al. | 707/3 |
| 6,154,773 A | 11/2000 | Roberts et al. | 709/219 |
| 6,161,132 A | 12/2000 | Roberts et al. | 709/219 |
| 6,201,176 B1 | 3/2001 | Yourlo | 84/609 |
| 6,230,192 B1 | 5/2001 | Roberts et al. | 709/217 |
| 6,230,207 B1 | 5/2001 | Roberts et al. | 709/236 |
| 6,240,459 B1 | 5/2001 | Roberts et al. | 709/232 |
| 6,304,523 B1 | 10/2001 | Jones et al. | 369/30 |
| 6,321,200 B1 | 11/2001 | Casey | 704/500 |
| 6,330,593 B1 | 12/2001 | Roberts et al. | 709/217 |
| 6,434,520 B1 | 8/2002 | Kanevsky et al. | 704/243 |
| 6,453,252 B1 | 9/2002 | Laroche | 702/75 |
| 6,463,433 B1 | 10/2002 | Baclawski | 707/5 |
| 6,505,160 B1 | 1/2003 | Levy et al. | 704/270 |
| 6,512,796 B1 | 1/2003 | Sherwood | 374/242 |
| 6,539,395 B1 | 3/2003 | Gjerdingen et al. | 707/102 |
| 6,570,991 B1 | 5/2003 | Scheirer et al. | 381/110 |
| 6,571,144 B1 | 5/2003 | Moses et al. | 700/94 |
| 6,574,594 B2 | 6/2003 | Pitman et al. | 704/236 |
| 6,604,072 B2 | 8/2003 | Pitman et al. | 704/231 |
| 6,657,117 B2 | 12/2003 | Weare et al. | 84/668 |
| 6,675,174 B1 | 1/2004 | Bolle et al. | 707/104.1 |
| 6,826,350 B1 | 11/2004 | Kashino et al. | 386/46 |
| 6,829,368 B2 | 12/2004 | Meyer et al. | 382/100 |
| 6,963,975 B1 | 11/2005 | Weare | 713/176 |
| 6,990,453 B2* | 1/2006 | Wang et al. | 704/270 |
| 7,277,766 B1 | 10/2007 | Khan et al. | |
| 7,328,153 B2* | 2/2008 | Wells et al. | 704/231 |
| 7,451,078 B2 | 11/2008 | Bogdanov | 704/273 |
| 7,783,889 B2* | 8/2010 | Srinivasan | 713/179 |
| 2002/0023020 A1 | 2/2002 | Kenyon et al. | 705/26 |
| 2002/0028000 A1 | 3/2002 | Conwell et al. | 382/100 |
| 2002/0055920 A1 | 5/2002 | Fanning et al. | 707/3 |
| 2002/0082731 A1* | 6/2002 | Pitman et al. | 700/94 |
| 2002/0087565 A1 | 7/2002 | Hoekman et al. | 707/100 |
| 2002/0101989 A1 | 8/2002 | Markandey et al. | 380/210 |
| 2002/0126872 A1* | 9/2002 | Brunk et al. | 382/100 |
| 2002/0133499 A1 | 9/2002 | Ward et al. | 707/102 |
| 2002/0178410 A1* | 11/2002 | Haitsma et al. | 714/709 |
| 2003/0018709 A1 | 1/2003 | Schrempp et al. | 709/203 |
| 2003/0028796 A1 | 2/2003 | Roberts et al. | 713/193 |
| 2003/0033321 A1 | 2/2003 | Schrempp et al. | 707/104.1 |
| 2003/0046283 A1 | 3/2003 | Roberts | 707/6 |
| 2003/0086341 A1 | 5/2003 | Wells et al. | 369/13.56 |
| 2003/0101162 A1 | 5/2003 | Thompson et al. | 707/1 |
| 2003/0131350 A1* | 7/2003 | Peiffer et al. | 725/18 |
| 2003/0135513 A1 | 7/2003 | Quinn et al. | 707/102 |
| 2003/0174861 A1 | 9/2003 | Levy et al. | 382/100 |
| 2003/0191764 A1 | 10/2003 | Richards | 707/100 |
| 2004/0028281 A1 | 2/2004 | Cheng et al. | 382/232 |
| 2004/0034441 A1 | 2/2004 | Eaton et al. | 700/94 |
| 2004/0074378 A1 | 4/2004 | Allamanche et al. | 84/616 |
| 2004/0093202 A1* | 5/2004 | Fischer et al. | 704/216 |
| 2004/0143349 A1 | 7/2004 | Roberts et al. | 700/94 |
| 2004/0172411 A1 | 9/2004 | Herre et al. | 707/104.1 |
| 2004/0267522 A1 | 12/2004 | Allamanche et al. | 704/205 |
| 2005/0017879 A1 | 1/2005 | Linzmeier et al. | 341/50 |
| 2005/0065976 A1 | 3/2005 | Holm et al. | 707/104.1 |
| 2005/0141707 A1 | 6/2005 | Haitsma et al. | 380/201 |
| 2005/0177372 A1* | 8/2005 | Wang et al. | 704/273 |
| 2005/0197724 A1 | 9/2005 | Neogi | 700/94 |
| 2005/0259819 A1* | 11/2005 | Oomen et al. | 380/200 |
| 2006/0075237 A1* | 4/2006 | Seo et al. | 713/176 |
| 2006/0122839 A1 | 6/2006 | Li-Chun Wang et al. | 704/273 |
| 2006/0143190 A1 | 6/2006 | Haitsma et al. | |
| 2006/0149552 A1* | 7/2006 | Bogdanov | 704/273 |
| 2006/0190450 A1 | 8/2006 | Holm et al. | 707/6 |
| 2006/0229878 A1 | 10/2006 | Scheirer | 704/273 |
| 2007/0049250 A1 | 3/2007 | Chambers et al. | |
| 2007/0055500 A1* | 3/2007 | Bilobrov | 704/217 |
| 2007/0156401 A1* | 7/2007 | Nagano et al. | 704/239 |
| 2007/0192087 A1 | 8/2007 | Kim et al. | |
| 2008/0313140 A1 | 12/2008 | Pereira et al. | |
| 2009/0052784 A1* | 2/2009 | Covell et al. | 382/209 |
| 2009/0216755 A1 | 8/2009 | Itamar | |
| 2009/0276468 A1* | 11/2009 | Menon et al. | 707/200 |
| 2010/0318586 A1 | 12/2010 | Wessling | |
| 2011/0173185 A1 | 7/2011 | Vogel | |
| 2011/0276567 A1 | 11/2011 | Asikainen et al. | |
| 2012/0020647 A1 | 1/2012 | Vogel | |

FOREIGN PATENT DOCUMENTS

| | | |
|---|---|---|
| WO | 01/37465 | 5/2001 |
| WO | WO 02/11123 A2 | 2/2002 |
| WO | 02/65782 | 8/2002 |
| WO | 02/077966 | 10/2002 |
| WO | 02/093823 | 11/2002 |
| WO | 03009277 A2 | 1/2003 |
| WO | 03/067466 | 8/2003 |
| WO | 03/096337 | 11/2003 |
| WO | 2004/044820 | 5/2004 |
| WO | 2004/077430 | 9/2004 |
| WO | 2004/081817 | 9/2004 |
| WO | 2007133754 A2 | 11/2007 |
| WO | 2009026564 A1 | 2/2009 |
| WO | 2009/036435 | 3/2009 |

OTHER PUBLICATIONS

R. Venkatesan, S.M. Koon, M.H. Jakubowski and P. Moulin, "Robust Image Hashing", ICIP'00—IEEE International Conference on Image Processing, Vancouver, Sep. 10-13, 2000.

Chun-Shien Lu "Audio Fingerprinting Based on Analyzing Time-Frequency Localization of Signals", IEEE, pp. 174-177 (2002).

Haitsma, J., et al., "A Highly Robust Audio Fingerprinting System", ISMIR 2002, $3^{rd}$ Int'l Conference on Music Information Retrieval, IRCAM-Centre Pompidou, Paris, France, Oct. 13-17, 2002, pp. 1-9.

International Search Report and Written Opinion of the International Searching Authority, PCT/US2005/46096, Jul. 16, 2008.

Haitsma, J., et al., "Robust Audio Hashing for Content Identification," in Proceedings of the Content-Based Multimedia Index, Italy (Sep. 2001).

Haitsma, J., et al., "An Efficient Database Search Strategy for Audio Fingerprinting", in Proceedings of the 2003 IEEE Radar Conference, Dec. 9, 2002, pp. 178-181.

U.S. Appl. No. 13/049,537, filed Mar. 16, 2011. Applicant: Joonas Asikainen.

U.S. Appl. No. 13/049,553, filed Mar. 16, 2011. Applicant: Joonas Asikainen.

International Search Report and Written Opinion of the International Searching Authority, PCT/US2010/061282, Apr. 5, 2011.

U.S. Appl. No. 13/093,341, filed Apr. 25, 2011. Applicant Joonas Asikainen.

U.S. Appl. No. 13/113,484, filed May 23, 2011. Applicant: Joonas Asikainen.

International Search Report and Written Opinion of the International Searching Authority, PCT/US2010/061285, Apr. 19, 2011.

Avery Li-Chun Wang, "An Industrial-Strength Audio Search Algorithm", Proc. Of $4^{th}$ International Conference on Music Information Retrieval, Baltimore, MD, Oct. 27, 2003.

Steven Scott Lutz, "Hokua—a Wavelet Method for Audio Fingerprinting", M.S. Thesis, pp. i-82, Dec. 31, 2009.

* cited by examiner

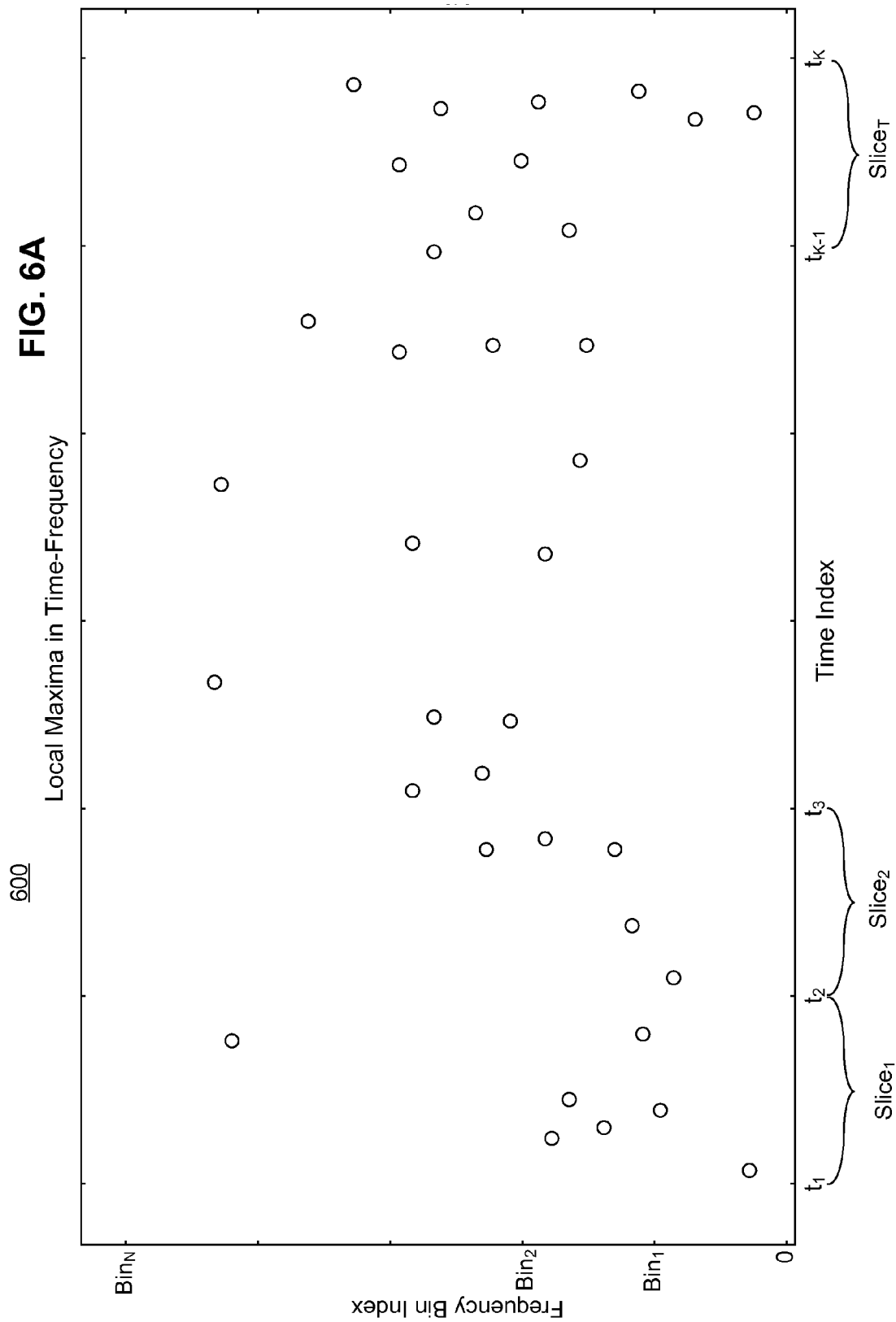

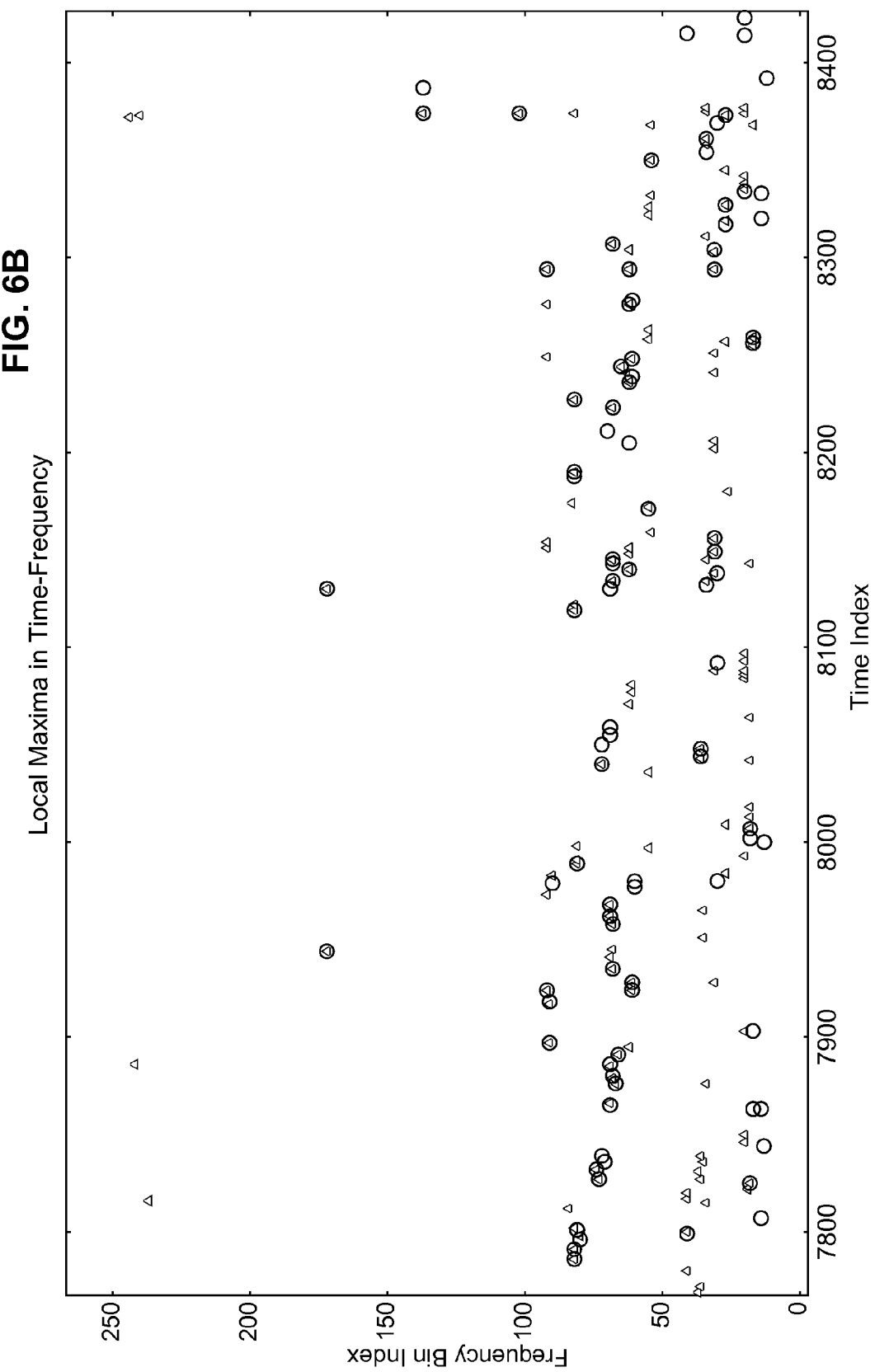

APPARATUS AND METHOD FOR GENERATING AN AUDIO FINGERPRINT AND USING A TWO-STAGE QUERY

BACKGROUND

1. Field

Example aspects of the present invention generally relate to delivering metadata associated with recordings to a user, and more particularly to performing rolling audio recognition of the recordings.

2. Related Art

Background

An "audio fingerprint" (e.g., "fingerprint", "acoustic fingerprint", "digital fingerprint") is a measure of certain acoustic properties that is deterministically generated from an audio signal that can be used to identify an audio sample and/or quickly locate similar items in an audio database. Typically, an audio fingerprint operates as a unique identifier for a particular item, such as a CD, a DVD and/or a Blu-ray Disc, and is an independent piece of data that is not affected by metadata. Rovi™ Corporation has databases that store over 25 million unique fingerprints for various audio samples. Practical uses of audio fingerprints include, without limitation, identifying songs, identifying records, identifying melodies, identifying tunes, identifying advertisements, monitoring radio or television broadcasts, monitoring multipoint and/or peer-to-peer networks, managing sound effects libraries and identifying video files.

BRIEF DESCRIPTION

"Audio fingerprinting" is the process of generating an audio fingerprint. U.S. Pat. No. 7,277,766, entitled "Method and System for Analyzing Digital Audio Files", which is herein incorporated by reference, provides an example of an apparatus for audio fingerprinting an audio signal. U.S. Pat. No. 7,451,078, entitled "Methods and Apparatus for Identifying Media Objects", which is herein incorporated by reference, provides another example of an apparatus for generating an audio fingerprint of an audio recording.

In designing any audio fingerprinting algorithm, one technical challenge is to construct an audio fingerprint that is invariant to noise and signal distortions. It is also desirable to construct the audio fingerprint quickly and as compact as possible. It is also desirable to find a match for the audio fingerprint from a large database as quickly and efficiently as possible.

Despite the technical efforts to identify audio recordings quickly and accurately, there is still a need to produce more robust audio fingerprints particularly when given only a short and relatively noisy audio sample. In addition, there is a need to construct a fingerprint that supports efficient and scalable searching to shorten the time needed to identify recordings. There is also a need for a fast and noise-robust searching and matching algorithm for a recognition server.

Example embodiments described herein meet the above identified needs by providing a method for generating an audio fingerprint by transforming an audio sample of a recording to a time-frequency domain and storing each time-frequency pair in a matrix array, detecting a plurality of local maxima for a predetermined number of time slices, selecting a predetermined number of largest-magnitude maxima from the plurality of local maxima detected by said detecting, and generating one or more hash values corresponding to the predetermined number of largest-magnitude maxima. The steps can be performed by using at least one processor or other suitable device.

Other example embodiments provide for an apparatus for generating an audio fingerprint. The processor operates to transform an audio sample of a recording to a time-frequency domain and storing each time-frequency pair in a matrix array, detect a plurality of local maxima for a predetermined number of time slices, select a predetermined number of largest-magnitude maxima from the plurality of local maxima detected by said detection, and generate one or more hash values corresponding to the predetermined number of largest-magnitude maxima.

Still other example embodiments provide for a computer-readable medium having stored thereon sequences of instructions, the sequences of instructions including instructions which when executed by a computer system cause the computer system to perform: transforming an audio sample of a recording to a time-frequency domain and storing each time-frequency pair in a matrix array, detecting a plurality of local maxima for a predetermined number of time slices, selecting a predetermined number of largest-magnitude maxima from the plurality of local maxima detected by the detecting, and generating one or more hash values corresponding to the predetermined number of largest-magnitude maxima.

Further features and advantages, as well as the structure and operation, of various example embodiments are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings in which like reference numbers indicate identical or functionally similar elements.

FIG. 6A depicts the maxima an exemplary time-frequency image of an audio recording in accordance with an embodiment of the present invention.

FIG. 6B shows a comparison of a relatively noise free digital recording and a non-corrupted sample of the audio recording of FIG. 6A.

DETAILED DESCRIPTION

Definitions

Figure 1:
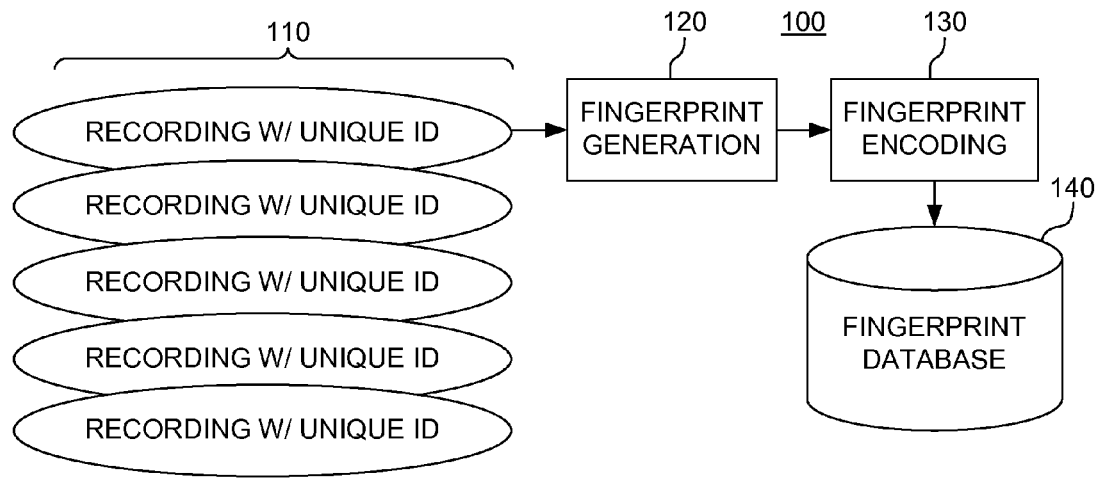
FIG. 1 illustrates a system for generating a fingerprint database.

Some terms are defined below for easy reference. However, it should be understood that these terms are not rigidly restricted to these definitions. A term may be further defined by its use in other sections of this description.

The terms "content," "media content," "multimedia content," "program," "multimedia program," "show," and the like, are generally understood to include television shows, movies, games and videos of various types.

"Album" means a collection of tracks. An album is typically originally published by an established entity, such as a record label (e.g., a recording company such as Warner Brothers and Universal Music).

"Blu-ray", also known as Blu-ray Disc, means a disc format jointly developed by the Blu-ray Disc Association, and personal computer and media manufacturers including Apple, Dell, Hitachi, HP, JVC, LG, Mitsubishi, Panasonic, Pioneer, Philips, Samsung, Sharp, Sony, TDK and Thomson. The format was developed to enable recording, rewriting and playback of high-definition (HD) video, as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (405 nm) is that it has a shorter wavelength than a red laser (650 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have substantially similar physical dimensions as a traditional CD or DVD.

"Chapter" means an audio and/or video data block on a disc, such as a Blu-ray Disc, a CD or a DVD. A chapter stores at least a portion of an audio and/or video recording.

"Compact Disc" (CD) means a disc used to store digital data. A CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is 780 nm, and thus the light of a standard CD laser typically has a red color.

"Database" means a collection of data organized in such a way that a computer program may quickly select desired pieces of the data. A database is an electronic filing system. In some implementations, the term "database" may be used as shorthand for "database management system".

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk. Each device is configured to carry out one or more steps of the method of storing an internal identifier in metadata.

"Digital Video Disc" (DVD) means a disc used to store digital data. A DVD was originally developed for storing digital video and digital audio data. Most DVDs have substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is 650 nm, and thus the light of a standard DVD laser typically has a red color.

"Fuzzy search" (e.g., "fuzzy string search", "approximate string search") means a search for text strings that approximately or substantially match a given text string pattern. Fuzzy searching may also be known as approximate or inexact matching. An exact match may inadvertently occur while performing a fuzzy search.

"Link" means an association with an object or an element in memory. A link is typically a pointer. A pointer is a variable that contains the address of a location in memory. The location is the starting point of an allocated object, such as an object or value type, or the element of an array. The memory may be located on a database or a database system. "Linking" means associating with (e.g., pointing to) an object in memory.

"Metadata" generally means data that describes data. More particularly, metadata may be used to describe the contents of recordings. Such metadata may include, for example, a track name, a song name, artist information (e.g., name, birth date, discography), album information (e.g., album title, review, track listing, sound samples), relational information (e.g., similar artists and albums, genre) and/or other types of supplemental information such as advertisements, links or programs (e.g., software applications), and related images. Metadata may also include a program guide listing of the songs or other audio content associated with multimedia content. Conventional optical discs (e.g., CDs, DVDs, Blu-ray Discs) do not typically contain metadata. Metadata may be associated with a recording (e.g., song, album, video game, movie, video, or broadcast such as radio, television or Internet broadcast) after the recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network and a cellular network.

"Occurrence" means a copy of a recording. An occurrence is preferably an exact copy of a recording. For example, different occurrences of a same pressing are typically exact copies. However, an occurrence is not necessarily an exact copy of a recording, and may be a substantially similar copy. A recording may be an inexact copy for a number of reasons, including without limitation an imperfection in the copying process, different pressings having different settings, different copies having different encodings, and other reasons. Accordingly, a recording may be the source of multiple occurrences that may be exact copies or substantially similar copies. Different occurrences may be located on different devices, including without limitation different user devices, different MP3 players, different databases, different laptops, and so on. Each occurrence of a recording may be located on any appropriate storage medium, including without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device. Occurrences may be compiled, such as in a database or in a listing.

"Pressing" (e.g., "disc pressing") means producing a disc in a disc press from a master. The disc press preferably produces a disc for a reader that utilizes a laser beam having a wavelength of about 780 nm for CD, about 650 nm for DVD, about 405 nm for Blu-ray Disc or another wavelength as may be appropriate.

"Recording" means media data for playback. A recording is preferably a computer-readable recording and may be, for example, an audio track, a video track, a song, a chapter, a CD recording, a DVD recording and/or a Blu-ray Disc recording, among other things.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Signature" means an identifying means that uniquely identifies an item, such as, for example, a track, a song, an album, a CD, a DVD and/or Blu-ray Disc, among other items. Examples of a signature include without limitation the following in a computer-readable format: an audio fingerprint, a portion of an audio fingerprint, a signature derived from an audio fingerprint, an audio signature, a video signature, a disc signature, a CD signature, a DVD signature, a Blu-ray Disc signature, a media signature, a high definition media signature, a human fingerprint, a human footprint, an animal fingerprint, an animal footprint, a handwritten signature, an eye print, a biometric signature, a retinal signature, a retinal scan, a DNA signature, a DNA profile, a genetic signature and/or a genetic profile, among other signatures. A signature may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain signatures may not initially be computer-readable. For example, latent human fingerprints may be printed on a door knob in the physical world. A signature that is initially not computer-readable may be converted into a computer-readable signature by using any appropriate conversion technique. For example, a conversion technique for converting a latent human fingerprint into a computer-readable signature may include a ridge characteristics analysis.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Song" means a musical composition. A song is typically recorded onto a track by a record label (e.g., recording company). A song may have many different versions, for example, a radio version and an extended version.

"System" means a device or multiple coupled devices. A device is defined above.

"Theme song" means any audio content that is a portion of a multimedia program, such as a television program, and that recurs across multiple occurrences, or episodes, of the multimedia program. A theme song may be a signature tune, song, and/or other audio content, and may include music, lyrics, and/or sound effects. A theme song may occur at any time during the multimedia program transmission, but typically plays during a title sequence and/or during the end credits.

"Track" means an audio/video data block. A track may be on a disc, such as, for example, a Blu-ray Disc, a CD or a DVD.

"User" means a consumer, client, and/or client device in a marketplace of products and/or services.

"User device" (e.g., "client", "client device", "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a television, a CD player, a DVD player, a Blu-ray Disc player, a personal media device, a portable media player, an iPod™, a Zoom Player, a laptop computer, a palmtop computer, a smart phone, a cell phone, a mobile phone, an MP3 player, a digital audio recorder, a digital video recorder, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation Mozilla Firefox™ and Microsoft Internet Explorer™.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

I. Overview

Systems, methods, apparatus and computer-readable media are provided for performing rolling audio recognition and a multi-stage lookup procedure for rolling audio recognition. Generally, an audio fingerprint is generated from an audio sample (or "query clip") of a recording (e.g., song, album, video game, movie, video, or broadcast such as radio, television or internet broadcast). Once the audio sample has been fingerprinted, a retrieval engine is utilized to retrieve metadata associated with the recording. The retrieved metadata is then communicated to a user device for display. The user device can also use the metadata for other purposes, such as adjusting recording times for a DVR, updating a play listing, and the like. The audio sample being analyzed can start at any time into the recording. The ability to recognize content of the recording given any such audio sample is referred to herein as "rolling recognition."

In one embodiment, a recognition engine uses a two-stage lookup procedure to obtain a match for a query fingerprint in a recognition set including two or more sets of prestored information. One set of prestored information includes a set of hash values which are generated by processing a library of audio fingerprints of known recordings by using a hash function. The other set of prestored information includes recording fingerprints of a substantial length or the entire length of the known recordings, each such fingerprint referred to herein as "a full-recording fingerprint". The set of hash values can be stored in one database, while the set of full-recording fingerprints can be stored in another. Alternatively, they can be stored in the same database, for example as elements of records corresponding to the known recordings. The set of hash values of the known recordings are associated with the full-recording fingerprints of the known recordings.

In the first stage, the fingerprint of the audio sample, or "query fingerprint" is processed by using the hash function to generate "query hash values." The query hash values are compared against the set of hash values of the known recordings, or "known hash values" to locate a set of possible matches. The set of possible matches are referred to herein as "a candidate set." In the second stage, the query fingerprint is compared to the full-recording fingerprints corresponding to the candidate set.

Example embodiments are now described in more detail in terms of exemplary server-based and client or device-embedded environments for performing rolling recognition and a multi-stage lookup for rolling audio recognition of recordings. This is for convenience only and is not intended to limit the application of the present invention. In fact, after reading the following description, it will be apparent to one skilled in the relevant art(s) how to implement the invention in alternative embodiments (e.g., peer-to-peer architectures, etc.). Similarly, a recording including audio content may also be referred to as an "audio recording." Accordingly, the term "audio recording" as used herein is interchangeable with the term "recording." A recording, however may also include other content such as video, data and/or executable instructions.

II. System Architecture

FIG. 1 illustrates a system 100 for generating a fingerprint database 140. The fingerprint database 140 is used as a reference library for the recognition of unknown media content and is generated prior to receiving an audio fingerprint of an unknown recording from a client device. The reference data stored on the fingerprint database 140 is a recognition set of all of the available recordings 110 that have been assigned unique identifiers (or IDs) and processed by a fingerprint generation module 120, which generates one or more corresponding audio fingerprints. The fingerprint generation module 120 can be used for both generating the reference library and for recognizing an unknown recording.

Once the audio fingerprints for the recordings in the reference library have been generated, all of the audio fingerprints are analyzed and encoded into the data structure of the database 140 by a fingerprint library encoder 130. In one embodiment, the data structure includes a set of fingerprints organized into groups related by some criteria (also sometimes referred to as "feature groups," "summary factors," or simply "features") which are designed to optimize fingerprint access. Example criteria include, but are not limited to the hash values corresponding to known audio recordings. For example, the hash values associated with the known recordings can be organized based on the time offset of one or more components of an audio fingerprint.

Figure 2A:
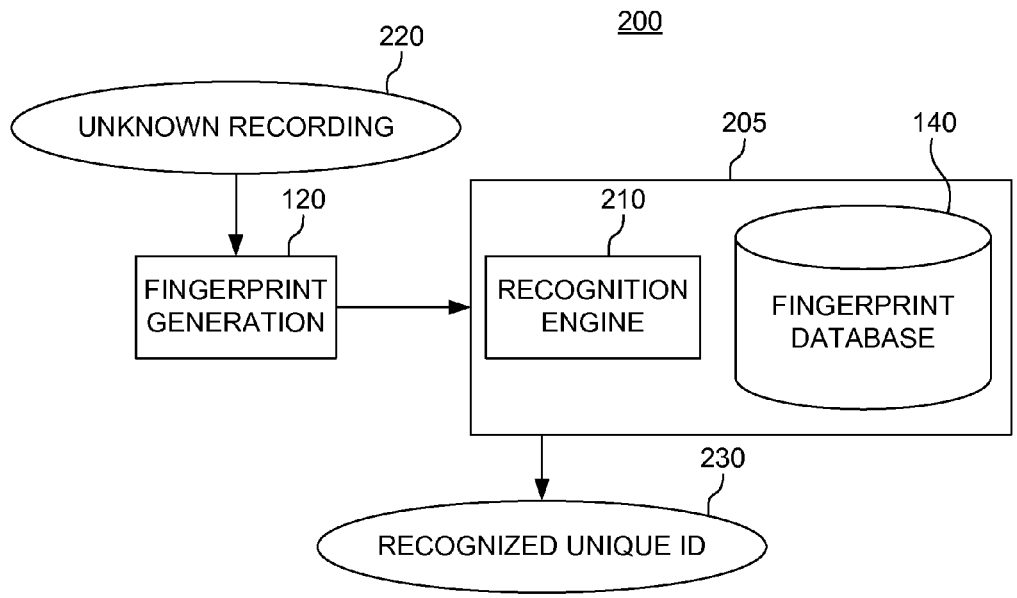
FIG. 2A illustrates a system for generating a fingerprint from an unknown audio recording and for correlating the audio recording to a unique ID used to retrieve metadata.

FIG. 2A illustrates a system 200 for generating an audio fingerprint of an unknown recording 220 and for correlating it to a unique ID used to retrieve metadata. The audio fingerprint is generated by using a fingerprint generation module 120 which analyzes an audio sample of the unknown recording 220 in the same manner as the fingerprint generation module 120 described above with respect to FIG. 1.

The query on the audio fingerprint takes place on a server 205. The server 205 uses a recognition engine 210 that attempts to match the audio fingerprint to one or more audio fingerprints stored in the fingerprint database 140. Once the fingerprint is matched to the recording's corresponding unique ID 230, the unique ID 230 is used to correlate metadata stored on a database.

Figure 3:
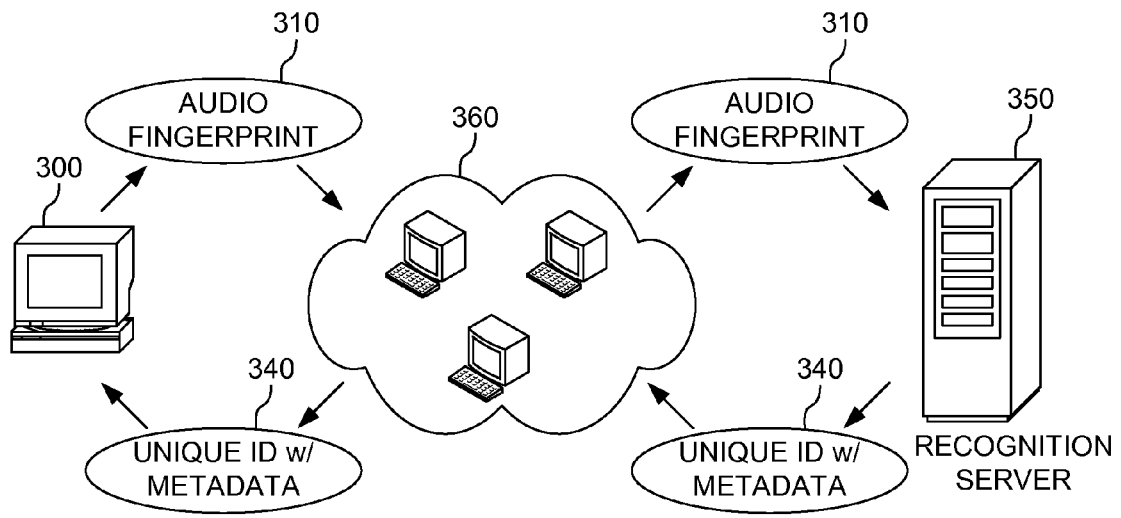
FIG. 3 illustrates a client-server based system for generating a fingerprint from an unknown audio recording and for retrieving metadata.

FIG. 3 illustrates a client-server based system for generating an audio fingerprint from an unknown audio recording and for retrieving metadata from a metadata database (not shown) accessed by a recognition server 350. The client device 300 may be any computing device on a network 360. The exchange of information between a client and the recognition server 350 includes returning a unique identifier (ID) and metadata 340 based on the audio fingerprint. The exchange can be automatic, triggered for example when an audio recording is uploaded onto a computer, such as by receiving streamed audio or by playing a media file stored on a storage device in a media player. Similarly, the exchange can be triggered by placing a physical medium into a user device (e.g., CD placed into a CD player, memory storing media files placed in a media player), which causes a fingerprint to be automatically generated by using a fingerprint generation module as described above with respect to FIG. 1. After the fingerprint generation module generates an audio fingerprint 310, the client device 300 transmits the audio fingerprint 310 onto the network 360 and/or to a recognition server 350. Alternatively, the fingerprint generation and recognition process can be triggered manually, for instance by a user selecting a menu option on a computer which instructs the generation and recognition process to begin.

A query of the audio fingerprint 310 takes place on the recognition server 350 by matching the audio fingerprint 310 to one or more fingerprints stored in a fingerprint database (not shown) which is also accessible by the recognition server 350. Upon recognition of the audio fingerprint 310, the recognition server 350 transmits an identifier (ID) associated with the recording and metadata 340 via the network 360 to the client device 300. The recognition server 350 may store a recognition set in a fingerprint database such as fingerprint database 140 as described above with respect to FIG. 1.

In an alternative embodiment, a client device 300 communicates an audio sample (in a digital or an analog format) instead of an audio fingerprint 310. In this embodiment, an audio fingerprint of the audio sample is generated on the recognition server 350 or other fingerprint generator on the network 360 instead of by the client device 300.

Alternatively, the invention may be implemented without a client-server architecture and/or without a network. All software and data necessary for the practice of the present invention may be stored instead on a storage device associated with the user device. For instance, an exemplary user device 400 is described below in relation to FIG. 4.

Figure 4:
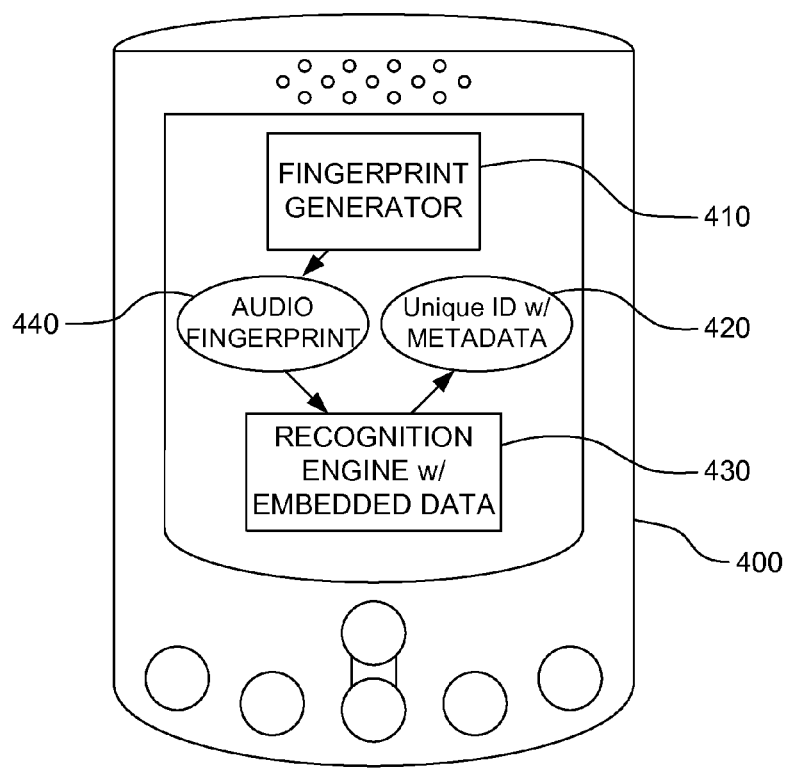
FIG. 4 is device-embedded system for delivering metadata.

As illustrated in FIG. 4, a recognition engine 430 may be installed onto a user device 400, which includes embedded data stored on a CD, DVD, Blu-ray Disc and/or disc reader, on a hard drive, in memory or other such storage device. The embedded data may contain a complete set or a subset of metadata available in a metadata database on a recognition server such as the recognition server 350 described above with respect to FIG. 3. The embedded data may also include a recognition set in a fingerprint database such as the fingerprint database 140 as described above with respect to FIG. 1. Updated databases may be loaded onto the device 400 by using data transfer techniques (e.g., FTP protocol). Thus, instead of coupling to a remote database server each time fingerprint recognition is sought, databases may be downloaded and updated occasionally from a remote host via a network. The databases may be downloaded via the Internet through a wireless connection such as WI-FI, WAP, Blue-Tooth, satellite or by docking the device to a PC and synchronizing it with a remote server over a local (e.g., home) or wide area network.

More particularly, after the fingerprint generation engine 410 generates an audio fingerprint 440, the device 400 internally communicates the audio fingerprint 440 to an internal recognition engine 430 which includes a library for storing metadata and recording identifiers (IDs). The recognition engine 430 recognizes a match, and communicates an ID and metadata corresponding to the digital recording to a processor, a display, or a communications link of the device 400.

III. Fingerprint Generation

Figure 5:
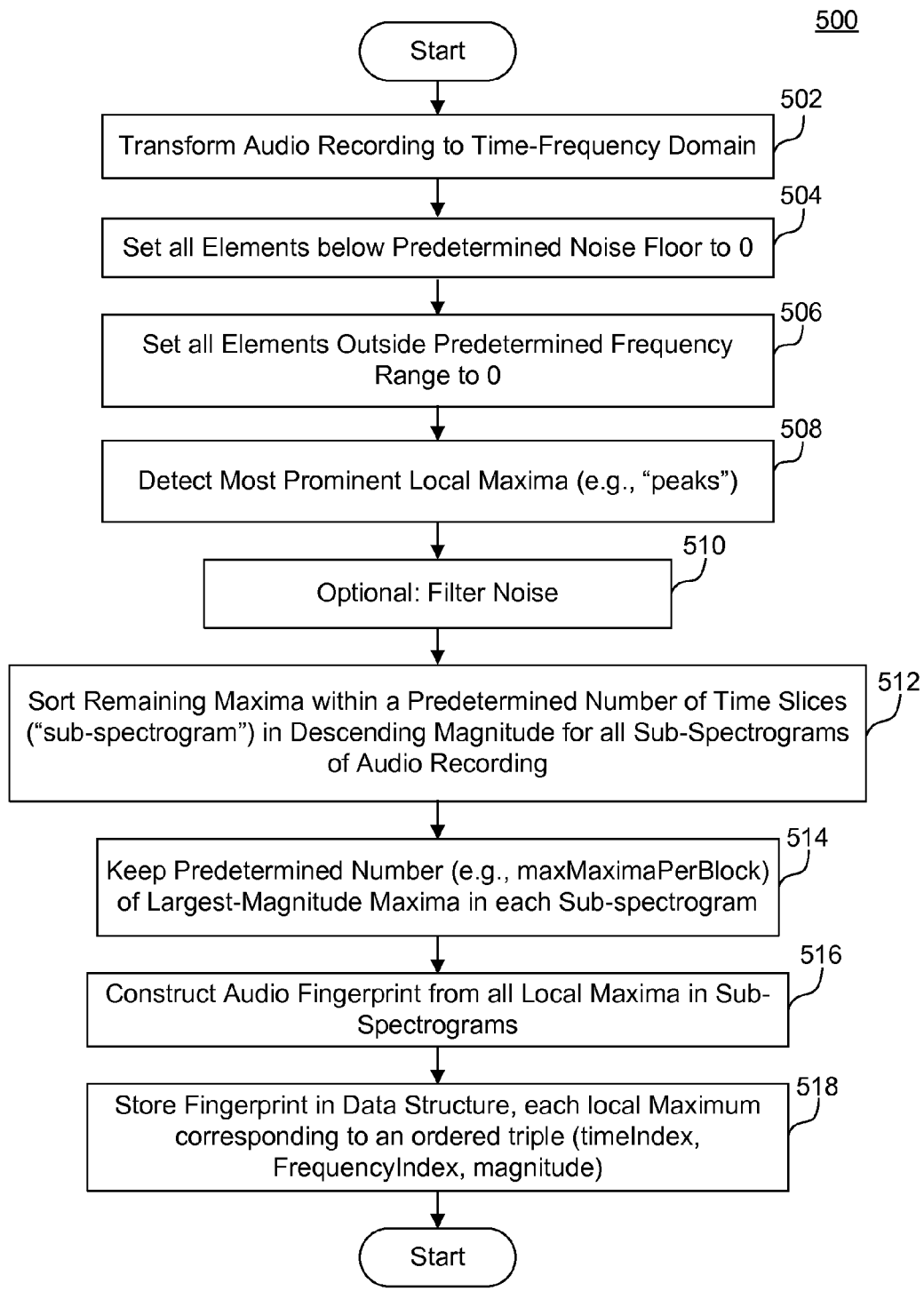
FIG. 5 is a flowchart diagram showing an exemplary procedure for generating an audio fingerprint in accordance with an embodiment.

FIG. 5 is a flowchart of a process 500 for generating a recognition set of fingerprints for known recordings. The known recordings preferably are clean and have low noise. The audio content in the known recordings, however, may have been recorded under noisy conditions such as in a live concert environment.

The audio fingerprints are stored in a fingerprint database such as fingerprint database 140. A detailed description of how the recognition set is stored in the fingerprint database 140 is described in more detail below with respect to FIG. 6.

The recognition set includes at least one audio fingerprint that has been constructed for each recording in a library of audio recordings as well as a unique identifier ("ID") corresponding to the media associated with the audio fingerprint.

At block 502, time-frequency data representing an audio portion of a recording from a library of recordings are computed. For the reader's convenience, the audio portion of the recording is referred to as an "audio recording".

FIG. 6A depicts a time-frequency image of the entire audio portion of a recording. Particularly, FIG. 6A depicts the maxima of an exemplary time-frequency image 600 computed by performing a Short-Time Fourier Transform (STFT) on the audio recording in accordance with an embodiment. As shown in FIG. 6A, the time-frequency representation data is displayed in the form of a spectrogram showing the spectral density of the audio signal as it varies with time. In one embodiment, the audio signals are represented in the frequency domain with a frequency axis in the vertical direction and a time axis in the horizontal direction. The result is a spectrogram of the audio recording.

Particularly, the spectrogram is an N×T image of the audio recording such that time runs along the horizontal axis and frequency runs along the vertical axis. The spectrogram thus has N rows, each row corresponding to the Nth frequency bin ($Bin_1$, $Bin_2$, ..., $Bin_N$) and T columns, each column corresponding to a time slice ($Slice_1$, $Slice_2$, ..., $Slice_T$). N is chosen to be a power of two that ranges from 512 to 8196 depending on the sample rate of the audio file and the amount of frequency and/or time smoothing desired. In one embodiment, the number of time slices per second, e.g., the number of consecutive columns in the spectrogram corresponding to one second of audio, is chosen to be in the range from 10 to 40 time slices. Each pixel is represented as a circle.

Equation (1) below is a matrix, where S(i,j) denotes the magnitude of the spectrogram at frequency bin "i" and time slice "j".

$$S(i, j) = \begin{bmatrix} S11 & S12 & * & * & * & S1j \\ S21 & S22 & * & * & * & S2j \\ * & * & * & * & * & * \\ * & * & * & * & * & * \\ * & * & * & * & * & * \\ Si1 & Si2 & * & * & * & Sij \end{bmatrix} \quad (1)$$

S(i, j) represents the amount of energy in the audio signal at a corresponding time and frequency. If viewed as an image, S(i, j) is the brightness of the pixel at the i'th row and j'th column in the image. The spectrogram shown in FIG. 6A thus provides a visual representation of an audio recording, where the brightness, or magnitude, of each pixel in the spectrogram is proportional to the amount of sound energy at the given time and frequency. Notes played on an instrument such as a piano, for instance, correspond to horizontal lines in the spectrogram. The harder the keys are struck, the brighter the pixel.

The brightest pixels (time-frequency regions with the most energy) are the least likely to be affected by interfering noise. Features from the highest magnitude regions of the spectrogram are extracted to construct the audio fingerprint.

Referring back to the process 500 of FIG. 5, at block 504, all the elements (pixels) that are below some predetermined noise floor are set to zero. Typical ranges for the noise floor are between −30 and −70 dB. At block 506, all the spectrogram elements that are not in some specified frequency range are set to zero as well. A predetermined parameter, "lowestFrequency," specifies the lowest allowable frequency. An exemplary range of values of lowestFrequency is 100 Hz to 300 Hz. Another parameter, "highestFrequency," specifies the highest allowable frequency, which in one embodiment is between 1500 Hz and 8000 Hz. In one embodiment, all the spectrogram elements outside this range are set to zero.

At block 508 the most prominent local maxima or "peaks" in the spectrogram are selected. For each element in the spectrogram, if its magnitude value is greater than the values of its surrounding neighbors, e.g., its surrounding eight neighbors, then it is chosen as a (local) maximum value.

As described below with reference to block 510, optionally, noise filtering may be performed.

At block 512 the audio fingerprint is constructed from the list of maxima. A set of the peaks over a particular time-interval, e.g., one second, are collected. In turn, an audio fingerprint for the entire audio recording is generated from the collected sets of peaks. The fewer peaks selected on average for a particular time-interval of audio, the more compact becomes the audio fingerprint.

Particularly, a predetermined number k consecutive spectrogram time slices are considered at a time, where k is in the range 20 to 40, corresponding to roughly one second of audio. A group of k consecutive spectrogram time slices is referred to herein as a "sub-spectrogram."

At block 514, within each approximately one-second sub-spectrogram, the contained maxima are sorted by descending magnitude. A predetermined parameter, "maxMaximaPer- Block," specifies the maximum number of maxima kept in each sub-spectrogram. The maxMaximaPerBlock largest-magnitude maxima in each sub-spectrogram are collected, where each maximum is specified by a time index (e.g., the time slice index), a frequency bin index, and a magnitude. That is, each maximum corresponds to the ordered triple: (timeIndex, FrequencyIndex, magnitude). These three values may optionally be further quantized if it is desired to reduce the storage space requirements. The fingerprint is constructed as the set of these maxima, as shown in block 516, and at block 518 the set of maxima are stored in a list or array structure.

Referring again to block 510 optionally, noise filtering is performed to prune maxima that are too close to other elements of similar magnitude in the spectrogram. Such noise filtering may be accomplished by applying "box filters" to the maxima. One exemplary filter ("Filter 1") is a narrow-frequency, but long in time filter that has typical dimensions of, for example, one frequency-bin by twenty-five time slices. Another exemplary filter ("Filter 2") is a narrow-time, but long in frequency, filter having dimensions of, for example, twenty-five frequency-bin by one time slice. Yet another exemplary filter ("Filter 3") is a medium-frequency and medium-time filter having dimensions of, for example, ten frequency-bin by ten time slices.

For each local maximum in the spectrogram, a "box filter" of an appropriately specified size is used to filter the corresponding time/frequency values of the spectrogram that fall within the box filter. Particularly, the box filter is placed around a local maximum such that the local maximum is located at the center of the box filter. The mean value of all spectrogram elements that are inside the box filter are then computed, where the mean is denoted as "m". The value of the local maximum is denoted as "max". If the difference between the mean and the value of the local maximum, (max-m) exceeds some predetermined threshold, the local maximum is retained. Otherwise, the local maximum is discarded. As a result, a smaller set of spectrogram maxima are left.

Each occurrence of a recording copy may have dissimilar properties because, for example, different renderings of an audio recording may be produced. For example, different storage mediums will have different settings, encodings, and the like. Different pressing machines produce different discs. Also, a source file (e.g., one song), for example, may be encoded in various formats (e.g., MP3 at 32 kbs, 64 kbs, 128 kbs, etc., WMA at 32 kbs, 64 kbs, 128 kbs, etc.). Thus, while ideally each rendering is identical, this is not typically the case because of the various distortions caused by the manufacturing and recording processes and configurations for the same recording. The above description of how an audio fingerprint of a recording is generated can be applied to any such occurrence or configuration.

IV. Feature Hash Construction by Hash Processor

The above description as to how a fingerprint is generated applies to a short audio sample taken from an unknown recording and to the entire audio portion of a recording such as, for example, a known audio recording.

With respect to known audio recordings, hash values are generated for a predetermined number of time slice groups across the entire recording. Thus, each audio recording will have multiple hash values associated with it. The particular number of time slices used to generate a hash value may vary. The hash values need not be generated over a particular time slice interval or sub-spectrogram interval.

In one embodiment, the hash values are generated from a predetermined number of spectrogram peaks, for example two or three peaks. Using two-peak hash values, $(t_1, Bin_1)$ and $(t_2, Bin_2)$, for example, the hash value is preferably generated from the frequency bin of a peak from one sub-spectrogram (e.g., a left-most peak of $Bin_1$), the frequency bin of another peak of the same or another sub-spectrogram (e.g., a right most peak of $Bin_2$) and the quantized time difference between the two peaks, or the difference between the corresponding time slices. (e.g., $(t_2-t_1)$). The hash value is then the concatenation of these three numbers, $(Bin_1; Bin_2; (t_2-t_1))$. That is, the hash is generated as h=concatenate(quantize($Bin_1$; $Bin_2$; $(t_2-t_1)$). For each hash value, the corresponding key in a hash map corresponds to a list of (unique ID, Time Offset of peak) pairs. For example, one peak can be taken from, for example, 0.5 seconds into the audio sample (the "left most peak"), and another peak can be taken from 3 seconds into the audio sample (the "right most peak"). The hash value may be formed from these two peaks. A rule can be implemented to restrict a pair of peaks to within a predetermined time interval (e.g., 4 seconds).

Alternatively, the hash values can be generated from more than two peaks. A hash function can be constructed, for instance, from the three points: $(t_1; Bin_1), (t_2; Bin_2), (t_3; Bin_3)$. For example, the hash function can be constructed as the concatenation of suitably quantized values $(Bin_1; Bin_2; Bin_3; (t_3-t_2)/(t_2-t_1))$. Constructing the hash function in this way produces a hash value that is more invariant to time scaling of the audio recording. Likewise, a hash value that is invariant to frequency scaling can be constructed by using the quantized values $(t_1; t_2; t_3; (Bin_3-Bin_2)/(Bin_2-Bin_1))$. Still another possibility which provides more uniqueness (e.g., more possible hash values) is $(Bin_3; Bin_2; Bin_1; t_3-t_2; t_2-t_1)$. These hash values can also be packed inside a standard numerical type, for example a 64-bit integer.

As described above, an audio fingerprint can be constructed as the set of maxima, as shown in block 516 of FIG. 5. However, an audio fingerprint can also be defined as one or more hash values corresponding to the set of maxima.

V. Adding Records to a Recognition Server

Figure 2B:
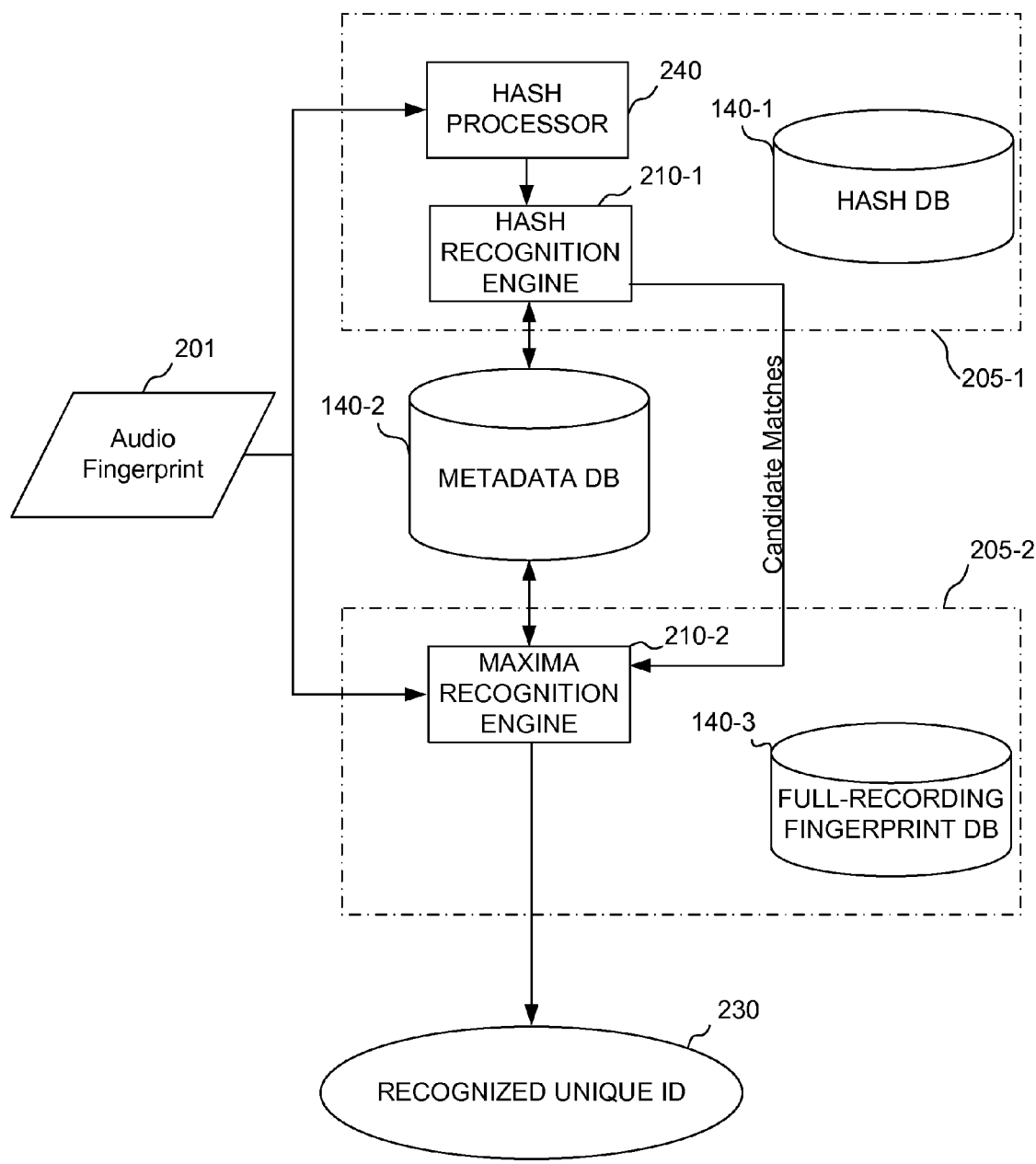
FIG. 2B illustrates a block diagram of a recognition server for correlating an audio fingerprint to a unique ID used to retrieve metadata.

The process of adding records corresponding to known recordings to a recognition server will now be described in more detail. Referring to FIGS. 2A and 2B, a server, such as server 205 operates as two distinct recognition servers, a "stage-1", or "first," recognition server 205-1 and a "stage-2", or "second," recognition server 205-2, as shown in FIG. 2B.

The stage-1 server 205-1 recognition engine includes a hash, or "first" recognition engine 210-1 and the stage-2 server 205-2 includes a maxima, or "second," recognition engine 210-2.

The fingerprint database 140 operates as three databases, a "hash", or "first," database 140-1, a "metadata", or "second," database 140-2, and a "full-recording fingerprint", or "third," database 140-3. The three databases 140-1, 140-2, and 140-3 may be constructed in various configurations, such as in the form of a single database server or multiple database servers. FIG. 2B illustrates one exemplary configuration, where the stage-1 recognition server 205-1 includes the hash database 140-1, the stage-2 recognition server 205-2 includes the full-recording fingerprint database 140-3, and the metadata database 140-2 is a separate database shared by both.

A full-recording fingerprint of a known recording is received by the server 205. In turn, the full-recording fingerprint is communicated to the stage-1 server 205-1 and the stage-2 server 205-2.

VI. Adding Records to the Stage-1 Recognition Server

Generally, the stage-1 recognition server 205-1 processes the full-recording fingerprint by using a hash processor 240 to generate corresponding hash values in accordance with a hash function. The hash values are stored in a hash table stored in the hash database 140-1 together with unique identifiers (IDs) which correspond to known recordings.

The full-recording fingerprint is generated as described above with respect to FIGS. 5 and 6A. Upon receipt of the full-recording fingerprint the stage-1 recognition server generates corresponding hash values, "$h_i$" (e.g., an integer). Each hash value, $h_i$ occurs at time offset "$t_{hi}$" and is associated with a unique ID. These values are stored in hash database 140-1, where $h_i$ is a key to the hash table. The hash table, thus forms a list of known recordings having full-recording fingerprints having a common hash value.

The hash table, can thus be used to map a hash value $h_i$ to a list of (unique ID, $t_{hi}$) pairs, where the unique ID identifies a known recording and $t_{hi}$ is the time offset of the hash key. In other words, the list of (unique ID, $t_{hi}$) pairs, represents one or more recordings whose full-recording fingerprints generate the same hash value, $h_i$.

If a list of (unique ID, $t_{hi}$) pairs corresponding to a particular hash value $h_i$ does not exist, one is generated. If a list corresponding to a hash value $h_i$ already exists, a (unique ID, $t_{hi}$) pair is appended to the end of the list.

Figure 7:
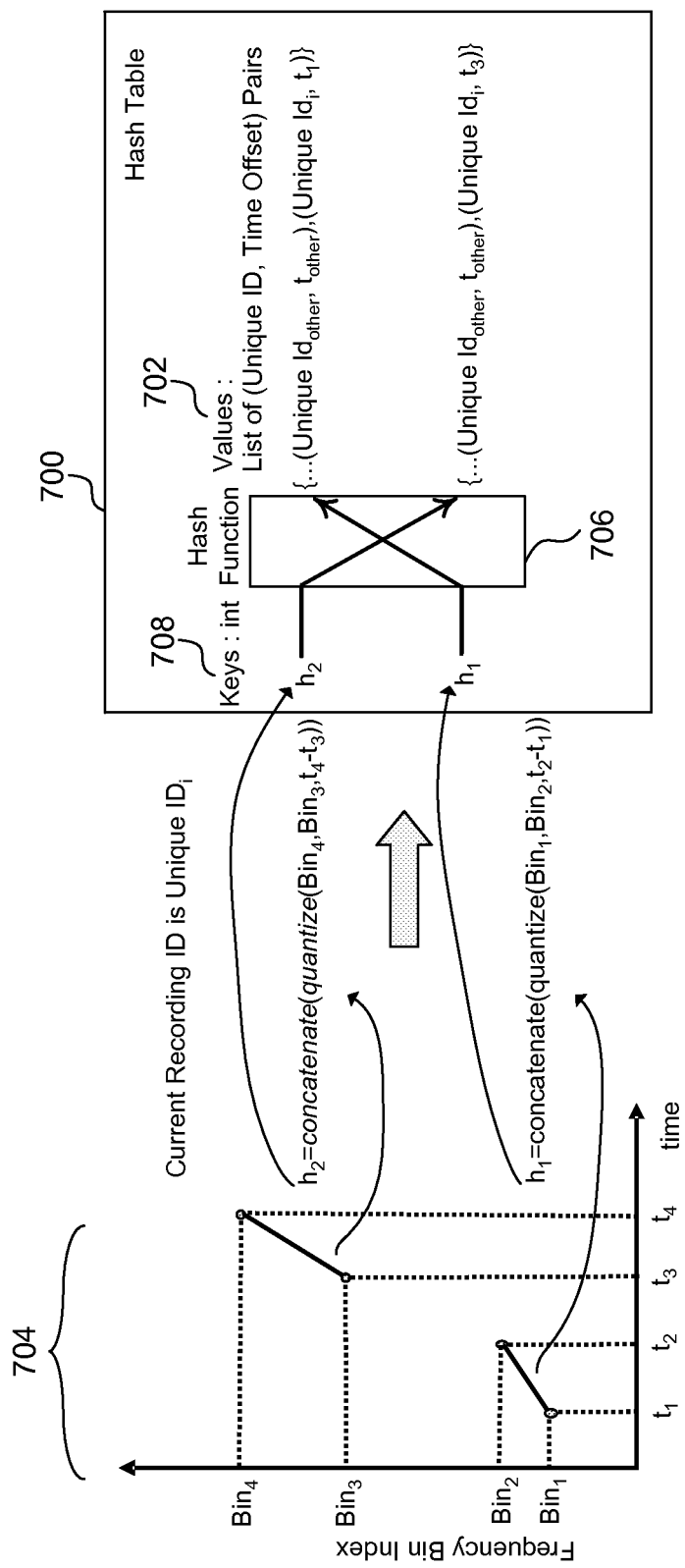
FIG. 7 shows an example procedure for adding hash values corresponding to full-recording fingerprints to a database.

FIG. 7 shows an example procedure for adding hash values corresponding to full-recording fingerprints to a hash table 700 in hash database 140-1. In this example, hash values 702 are generated for each full-recording fingerprint. Particularly, each hash value is generated from two spectrogram maxima as depicted by the spectrogram of feature points 704. As shown in FIG. 7, hash values $h_1$ and $h_2$ are generated from four fingerprint maxima as shown on the spectrogram 704, namely points $(t_1, Bin_1)$, $(t_2, Bin_2)$, $(t_3, Bin_3)$, and $(t_4, Bin_4)$, as $h_1$=concatenate(quantize($Bin_1, Bin_2$, $t_2-t_1$)) and $h_2$=concatenate(quantize($Bin_4, Bin_3, t_4-t_3$)) (hash function 706). The offset of a given hash is defined as the quantized time value of its leftmost, or "first," point. In this example, hash value $h_1$ has an offset of $t_1$ and hash value $h_2$ has an offset of $t_3$. These values are stored in the hash table in hash database 140-1, where $h_i$ is a key 708 to the hash table 700.

Other hash functions can be used in place of the two-point hash function 706 shown in FIG. 7. For example, the three point hash function described above can be used instead.

VII. Adding Records to the Metadata Database

A metadata table containing metadata associated with the unique IDs is generated and stored in metadata database 140-2. The metadata table maps unique IDs to corresponding metadata containers in the metadata database 140-2.

After all hash values for a known recording have been added to the hash table, the metadata associated with the known recording is added to a metadata table in metadata database 140-2. In one embodiment, the metadata table is structured in the form of a hash table, where one column of the table is a key, namely the unique ID, and the other column is a hash value of the metadata.

VIII. Adding Records to the Stage-2 Recognition Server

The maxima of the full-recording fingerprint are stored in a table, "full-recording fingerprint table" in the full-recording fingerprint database 140-3, together with a corresponding unique ID. In one embodiment, the full-recording fingerprint table is structured in the form of a hash table, where one column of the table is a key, namely the unique ID, and the other column is the hash value of the full-recording fingerprint. Particularly, the stage-2 recognition server uses the full-recording fingerprint table to map each unique ID to a full-recording fingerprint. The full-recording fingerprint maxima are stored in an array sorted by the time index of corresponding maxima. The process of adding a record associated with a recording to the full-recording fingerprint database 140-2 is performed by storing a unique ID and corresponding audio fingerprint into the full-recording fingerprint table.

IX. Recognition Process by Stage-1 and Stage-2 Recognition Servers

As described above, a recognition set of known recordings are stored in a server such as the server 205 (FIGS. 2A and 2B) or recognition server 350 (FIG. 3). The recognition set includes data corresponding to at least one audio fingerprint that has been constructed for each recording in a library of audio recordings as well as a unique identifier ("ID") corresponding to the media associated with the fingerprint. Corresponding metadata (e.g., title, artist, album, game, broadcast schedule, etc.) are also added to the same fingerprint database.

Recognition is performed by receiving an audio sample such as, for example, a query audio clip of an unknown recording, computing its audio fingerprint and then generating a number of hash values from the audio fingerprint. The audio fingerprint of the sample can be generated either on the source user device, or a client, if constructed to perform the fingerprinting process described above, or on a remote server receiving the audio sample, for example over a voice communications interface.

The fingerprint of the short, incomplete, and/or noisy audio sample is constructed the same way as an audio fingerprint for a noise free, known audio recording. Instead of obtaining the time-frequency data for the entire recording, the audio fingerprint is generated from only a sample of the unknown audio recording.

The recognition server (e.g., 205) is queried with an audio fingerprint of an audio sample (or "query clip"). If the audio fingerprint of the audio sample matches a record of the recognition set, the server returns corresponding metadata along with a time offset into the audio recording. The time offset identifies a time within the audio recording corresponding to the match. Otherwise the server communicates a signal indicating that a match has not been found. An exemplary query clip is 5-20 seconds of the audio portion of a digital recording, for instance.

The process of performing media content recognition, such as for audio recording lookups, by using an exemplary two-stage process will now be described in more detail with reference to FIG. 2B. As described above, the server 205 operates as two distinct recognition servers, a stage-1, or "first," recognition server 205-1 and a stage-2, or "second," recognition server 205-2. A query fingerprint received by the server 205 is communicated to the stage-1 recognition server 205-1 and the stage-2 recognition server 205-2, each having its own respective recognition engine: a hash, or "first" recognition engine 210-1 and a maxima, or "second," recognition engine 210-2, respectively. The fingerprint database 140 operates as three databases, a hash, or "first," database 140-1, a metadata, or "second," database 140-2, and a full-recording fingerprint, or "third," database 140-3.

X. Stage-1 Recognition Process

The stage-1 recognition server 205-1 determines a small set of possibly matching audio recordings ("candidate matches") for a given query fingerprint. A hash processor 240 processes the query fingerprint to generate corresponding hash values in accordance with a hash function, such as the two-maxima and three-maxima hash functions described above. The hash values generated by the hash processor 240 are compared against the hash table stored in the hash database 140-1 for candidate matches.

In one example, the best candidate matches are those that have the most hash values in common with the query fingerprint such that the hash values also occur at substantially the same relative time offsets. That is, the difference in time-offsets of a hash value in the matching recording in the stage-1 database 140-1 and the offset of the same hash value calculated from the query fingerprint should be identical (or nearly so) for several hash values from the query fingerprint.

For each query fingerprint hash value $h_i$ occurring at time offset "tQuery$_{hi}$" within the query fingerprint, the hash table stored in hash database 140-1 is used to look up the list of (unique ID, $t_{hi}$) pairs, where as explained above, "unique ID" is an identifier for a known recording and "$t_{hi}$" is a time offset within the full-recording fingerprint. In other words, each (unique ID, $t_{hi}$) specifies that the hash value $h_i$ occurs in a recording with unique ID at a time offset $t_{hi}$ within the recording. For each item in the list, a density hash key is computed as the concatenation of the values in the pair (unique ID, $t_{hi}$–tQuery$_{hi}$) and a corresponding hits counter value is incremented. A temporary density hash table maps a key in the table, also referred to as a "density map key", to a hits counter value. Each time the same density map key is encountered, the corresponding hits counter value is incremented.

In one embodiment, the density hash table is cleared at the beginning of each new query clip recognition attempt. The density hash table is used to keep track, for each candidate match, the number of hash values generated from the query fingerprint that correspond to the candidate match. Once the hits counter reaches a predetermined threshold for a candidate match, the (unique ID, matchTimeOffset) is added to the list of candidate matches, where "matchTimeOffset" is the time offset within the known recording associated with the unique ID where the hash values were found to match.

In another example, a candidate match is defined as a recording that has at least one hash value generated from the full-recording fingerprint of the recording at any time offset where the hash value matches any of the hash values of the query fingerprint. The hash values of the query fingerprint may also occur at any time offset. Thus, a single matching hash value is sufficient in order for a recording to be considered a match candidate.

It may be the case, however, that no match is found. In such a case, a notification message indicating that no match was found is communicated to the originating device (or internal processor in the case of an embedded device).

X. Stage-2 Recognition Process

Generally, the set of candidate matches obtained by the stage-1 recognition server 205-1 is communicated to the stage-2 server 205-2, which uses a maxima recognition engine 210-2 to perform a detailed matching of the query fingerprint to corresponding maxima of the full-recording fingerprints specified by the candidate matches. As describe above, the full-recording fingerprint maxima are stored in a table, "full-recording fingerprint table" in the full-recording fingerprint database 140-3. As a result, the stage-2 server 210-2 prunes the candidate matches to the most positively matching recording in the recognition set.

A more detailed description of the stage-2 recognition process follows. The stage-2 recognition server 210-2 receives a list of candidate matches, (Unique ID$_1$, matchTimeOffset$_1$), (Unique ID$_2$, matchTimeOffset$_2$), . . . , (Unique ID$_1$, matchTimeOffset$_1$), from the stage-1 recognition server 210-1, where Unique ID$_i$ refers to the recording identifier of the match candidate and matchTimeOffset$_i$ refers to the time offset within the recording that corresponds to the beginning of the query fingerprint. For each candidate match (Unique ID$_i$, matchTimeOffset$_i$), Unique ID$_i$ is used to query the full-recording fingerprint table in the full-recording fingerprint database 140-2 to obtain the corresponding full-recording fingerprint of a recording. The maxima of the full-recording fingerprint are presorted by a respective time index.

In one embodiment, because the maxima of the full-recording fingerprint have been presorted by a respective time index, a binary search can be performed to find the offset into the fingerprint array corresponding to matchTimeOffset$_i$. A linear scan is then performed forward in the fingerprint array, comparing the features to the query fingerprint, stopping when the time index exceeds the end of the query fingerprint. A match score is computed based on the number of matching maxima found per unit time. If the score exceeds a preset threshold, a match is declared. Otherwise the candidate match is pruned. If a match is eventually found, the corresponding recording metadata is obtained from metadata table stored in the metadata database 140-2 and returned. Otherwise, a "not found" or other type signal can be returned.

Alternatively, another type of search can be used instead of a binary search. For example, a linear search can be performed to find the offset into the fingerprint array corresponding to matchTimeOffset$_i$. The matching process can then continue as described above.

As described above, a match score is computed based on the number of matching maxima per unit time. In one exemplary implementation, this match score is computed by forming a matrix, queryMatrix, from the query fingerprint, where the matrix is constructed such that element (i,j) in queryMatrix takes the value one for each maximum in the query fingerprint at frequency bin "i" and time offset "j". All other elements of queryMatrix are equal to zero. The length of the query fingerprint, queryLength, (e.g., in time slices), corresponds to time, queryTimeSeconds, (e.g., in seconds) of audio.

After performing a binary search (or other type of search) in the full-recording fingerprint to obtain the time offset, matchTimeOffset$_i$, as described above, all maxima in the full-recording fingerprint in the time interval from matchTimeOffset$_i$ to (matchTimeOffset$_i$+queryLength) are extracted. For each maximum, tempMax$_j$, in an interval having frequency bin, tempBin$_j$, and time offset, tempOffset$_j$, the value of the corresponding element (tempBin$_j$, tempOffset$_j$–matchTimeOffset$_i$) of queryMatrix is obtained. If this value is equal to one, it indicates that the current maximum in the full-recording fingerprint was also found in the query fingerprint and the match score is incremented by one. Otherwise, the match score remains at its current value. After examining all maxima in the time interval matchTimeOffset$_i$ to (matchTimeOffset$_i$+queryLength), the final match score is computed as the current match score divided by the length of the query audio in seconds, "queryTimeSeconds". The final match score then specifies the number of maxima per second in the query fingerprint that were also found in the corresponding time interval of the full-recording fingerprint in the full-fingerprint database 140-3.

As described above, a metadata table containing metadata is stored in the metadata database 140-2. The metadata table is used to map unique IDs corresponding to the candidate matches to corresponding metadata containers in the metadata database 140-2. The containers can be a class, a data structure, or an abstract data type (ADT) whose instances are collections of other objects associated with a particular unique ID.

FIG. 6B shows a comparison of two spectrograms, one of a sample of an audio recording obtained from a relatively noise-free or "clean" recording as described above with respect to FIG. 6A, and another that was obtained from a noise-corrupted or "noisy" sample of the same recording. The circles correspond to peaks that were extracted from the clean audio spectrogram and the triangles correspond to peaks that were extracted from the noisy audio recording.

The audio sample of the clean version of the recording was obtained by ripping a CD and the audio sample image of the noisy version was obtained from a mobile telephone in a noisy environment. As can be seen from the comparison, the noise-corrupted audio still shares several peaks with the clean audio as shown by the triangles inside circles. The hash values of these peaks would thus return a match.

XII. Exemplary Computer Readable Medium Implementation

The example embodiments described above such as, for example, the systems and procedures depicted in FIGS. 1-5, and 7, or any part(s) or function(s) thereof, may be implemented by using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary in any of the operations described herein. In other words, the operations may be completely implemented with machine operations. Useful machines for performing the operation of the example embodiments presented herein include general purpose digital computers or similar devices.

Figure 8:
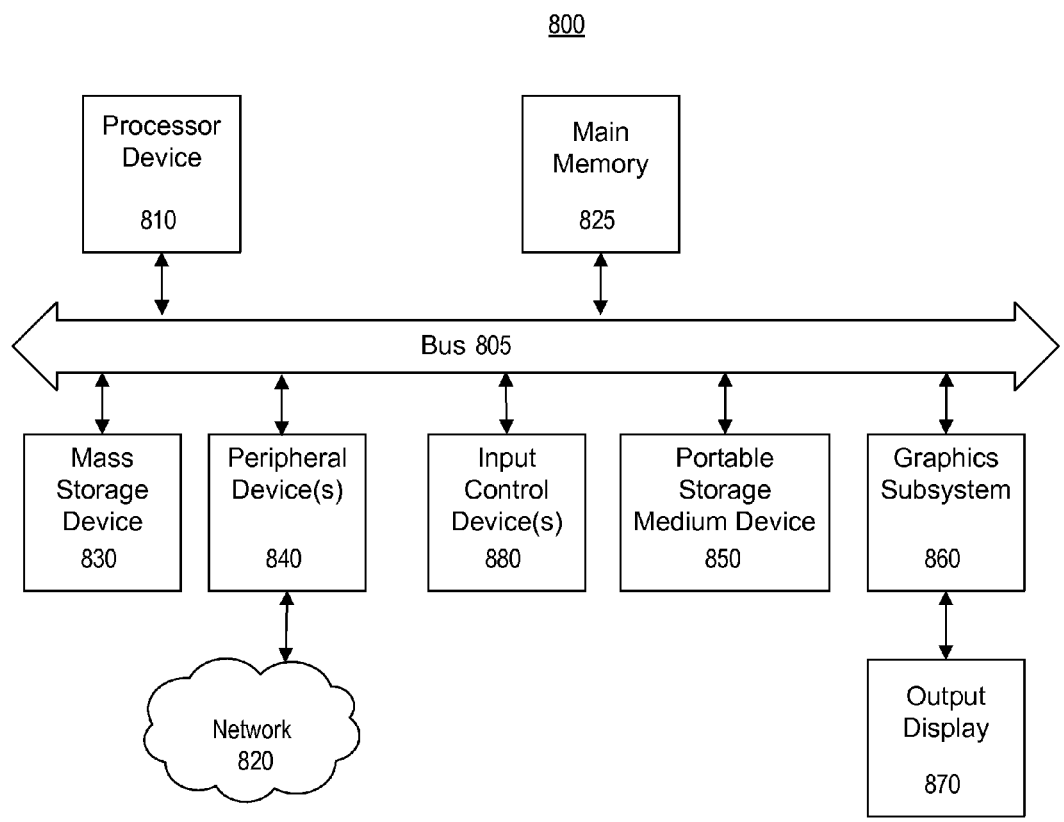
FIG. 8 is a block diagram of a general and/or special purpose computer system, in accordance with some embodiments.

FIG. 8 is a high-level block diagram of a general and/or special purpose computer system 800, in accordance with some embodiments. The computer system 800 may be, for example, a user device, a user computer, a client computer and/or a server computer, among other things.

The computer system 800 preferably includes without limitation a processor device 810, a main memory 825, and an interconnect bus 805. The processor device 810 may include without limitation a single microprocessor, or may include a plurality of microprocessors for configuring the computer system 800 as a multi-processor system. The main memory 825 stores, among other things, instructions and/or data for execution by the processor device 810. If the system is partially implemented in software, the main memory 825 stores the executable code when in operation. The main memory 825 may include banks of dynamic random access memory (DRAM), as well as cache memory.

The computer system 800 may further include a mass storage device 830, peripheral device(s) 840, portable storage medium device(s) 850, input control device(s) 880, a graphics subsystem 860, and/or an output display 870. For explanatory purposes, all components in the computer system 800 are shown in FIG. 8 as being coupled via the bus 805. However, the computer system 800 is not so limited. Devices of the computer system 800 may be coupled through one or more data transport means. For example, the processor device 810 and/or the main memory 825 may be coupled via a local microprocessor bus. The mass storage device 830, peripheral device(s) 840, portable storage medium device(s) 850, and/or graphics subsystem 860 may be coupled via one or more input/output (I/O) buses. The mass storage device 830 is preferably a nonvolatile storage device for storing data and/or instructions for use by the processor device 810. The mass storage device 830 may be implemented, for example, with a magnetic disk drive or an optical disk drive. In a software embodiment, the mass storage device 830 is preferably configured for loading contents of the mass storage device 830 into the main memory 825.

The portable storage medium device 850 operates in conjunction with a nonvolatile portable storage medium, such as, for example, a compact disc read only memory (CD-ROM), to input and output data and code to and from the computer system 800. In some embodiments, the software for storing an internal identifier in metadata may be stored on a portable storage medium, and may be inputted into the computer system 800 via the portable storage medium device 850. The peripheral device(s) 840 may include any type of computer support device, such as, for example, an input/output (I/O) interface configured to add additional functionality to the computer system 800. For example, the peripheral device(s) 840 may include a network interface card for interfacing the computer system 800 with a network 820.

The input control device(s) 880 provide a portion of the user interface for a user of the computer system 800. The input control device(s) 880 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 800 preferably includes the graphics subsystem 860 and the output display 870. The output display 870 may include a cathode ray tube (CRT) display and/or a liquid crystal display (LCD). The graphics subsystem 860 receives textual and graphical information, and processes the information for output to the output display 870.

Each component of the computer system 800 may represent a broad category of a computer component of a general and/or special purpose computer. Components of the computer system 800 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the processes of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method comprising:
    transforming a sample of a recording to a time-frequency domain and storing each time-frequency pair in a matrix array;
    setting all elements of the matrix array that are below a predetermined noise floor to zero and setting all elements of the matrix array that are outside a predetermined frequency range to zero;
    detecting a plurality of local maxima for a predetermined number of time slices;
    selecting a predetermined number of largest-magnitude maxima from the plurality of local maxima detected by said detecting;
    generating one or more hash values corresponding to the predetermined number of largest-magnitude maxima;
    comparing the one or more hash values to corresponding hash values of known recordings in a first stage query to identify a set of possible matches; and
    comparing the set of possible matches to a full-recording fingerprint of the sample in a second stage query, the full-recording fingerprint being a recording fingerprint of a substantial length or the entire length of a known recording.

2. The method of claim 1, further comprising the steps of:
    grouping the plurality of local maxima detected by said detecting in accordance with a time-slice interval; and
    grouping a plurality of time-slices intervals, thereby defining a sub-spectrogram.

3. The method of claim 2, further comprising the step of:
    determining a predetermined number of highest magnitude local maxima within each sub-spectrogram.

4. The method of claim 3, wherein determining of the predetermined number of highest magnitude local maxima includes:
    sorting the plurality of local maxima within each sub-spectrogram in either descending or ascending magnitude; and
    selecting a predetermined number of the largest-magnitude maxima.

5. The method of claim 1, further comprising the step of:
    storing each maxima in a data structure according to a time index, a frequency index and a magnitude of each maxima.

6. The method of claim 5, further comprising the step of:
    generating a hash value based on at least a portion of each maxima stored in the data structure.

7. The method of claim 1, further comprising the step of:
    performing noise filtering of the predetermined number of highest magnitude local maxima.

8. An apparatus comprising:
    at least one processor configured to:
    transform a sample of a recording to a time-frequency domain and storing each time-frequency pair in a matrix array;
    set all elements of the matrix array that are below a predetermined noise floor to zero and set all elements of the matrix array that are outside a predetermined frequency range to zero;
    detect a plurality of local maxima for a predetermined number of time slices;
    select a predetermined number of largest-magnitude maxima from the plurality of local maxima detected by said detection;
    generate one or more hash values corresponding to the predetermined number of largest-magnitude maxima;
    compare the one or more hash values to corresponding hash values of known recordings in a first stage query to identify a set of possible matches; and
    compare the set of possible matches to a full-recording fingerprint of the sample in a second stage query, the full-recording fingerprint being a recording fingerprint of a substantial length or the entire length of a known recording.

9. The apparatus of claim 8, further comprising:
    the at least one processor further configured to:
    group the plurality of local maxima detected by said detecting in accordance with a time-slice interval; and
    group a plurality of time-slices intervals, thereby defining a sub-spectrogram.

10. The apparatus of claim 9, wherein the at least one processor is further configured to determine a predetermined number of highest magnitude local maxima within each sub-spectrogram.

11. The apparatus of claim 10, wherein the predetermined number of highest magnitude local maxima are determined by:
    sorting the plurality of local maxima within each sub-spectrogram in either descending or ascending magnitude; and
    selecting a predetermined number if the largest-magnitude maxima.

12. The apparatus of claim 8, further comprising:
    a storage device configured to store each maxima in a data structure according to a time index, a frequency index and a magnitude of each maxima.

13. The apparatus of claim 12, wherein the at least one processor is further configured to generate a hash value based on at least a portion of each maxima stored in the data structure.

14. The apparatus of claim 8, further comprising:
    a noise filter operable to perform noise filtering of the predetermined number of highest magnitude local maxima.

15. A non-transitory computer-readable medium having stored thereon sequences of instructions, the sequences of instructions including instructions which when executed by a computer system causes the computer system to perform:

transforming a sample of a recording to a time-frequency domain and storing each time-frequency pair in a matrix array;

setting all elements of the matrix array that are below a predetermined noise floor to zero and setting all elements of the matrix array that are outside a predetermined frequency range to zero;

detecting a plurality of local maxima for a predetermined number of time slices;

selecting a predetermined number of largest-magnitude maxima from the plurality of local maxima detected by said detecting;

generating one or more hash values corresponding to the predetermined number of largest magnitude maxima;

comparing the one or more hash values to corresponding hash values of known recordings in a first stage query to identify a set of possible matches; and comparing the set of possible matches to a full-recording fingerprint of the sample in a second stage query, the full-recording fingerprint being a recording fingerprint of a substantial length or the entire length of a known recording.

16. The computer-readable medium of claim 15, further having stored thereon a sequence of instructions which when executed by the computer system causes the computer system to perform:

grouping the plurality of local maxima detected by said detecting in accordance with a time-slice interval; and grouping a plurality of time-slices intervals, thereby defining a sub-spectrogram.

17. The computer-readable medium of claim 16, further having stored thereon a sequence of instructions which when executed by the computer system causes the computer system to perform:

determining as predetermined number of highest magnitude local maxima within each sub-spectrogram.

18. The computer-readable medium of claim 17, wherein determining of the predetermined number of highest magnitude local maxima includes:

sorting the plurality of local maxima within each sub-spectrogram in either descending or ascending magnitude; and selecting a predetermined number of the largest-magnitude maxima.

19. The computer-readable medium of claim 15, further having stored thereon as sequence of instructions which when executed by the computer system causes the computer system to perform:

storing each maxima in a data structure according to it time index, a frequency index and a magnitude of each maxima.

20. The computer-readable medium of claim 19, further having stored thereon a sequence of instructions which when executed by the computer system causes the computer system to perform:

generating a hash value based on at least a portion of each maxima stored in the data structure.

21. The computer-readable medium of claim 15, further having stored thereon a sequence of instructions which when executed by the computer system causes the computer system to perform:

performing noise filtering of the predetermined number of highest magnitude local maxima.

* * * * *